United States Patent
Rollinson et al.

(10) Patent No.: US 10,493,823 B2
(45) Date of Patent: Dec. 3, 2019

(54) VARIABLE DISPLACEMENT VEHICLE COMPRESSOR WITH NOISE PREVENTION CONTROL

(71) Applicant: Ford Global Technologies, LLC, Dearborn, MI (US)

(72) Inventors: James C. Rollinson, Superior Township, MI (US); Suhas Venkatappa, Saline, MI (US); Mark C. Evans, Troy, MI (US); Zhengyu Liu, Novi, MI (US); Thomas A. White, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 15/169,792

(22) Filed: Jun. 1, 2016

(65) Prior Publication Data
US 2017/0349031 A1 Dec. 7, 2017

(51) Int. Cl.
*B60H 1/32* (2006.01)

(52) U.S. Cl.
CPC ......... *B60H 1/3211* (2013.01); *B60H 1/3204* (2013.01); *B60H 1/3208* (2013.01); *B60H 2001/3255* (2013.01); *B60H 2001/3266* (2013.01); *B60H 2001/3272* (2013.01)

(58) Field of Classification Search
CPC ................ B60H 1/3211; B60H 1/3204; B60H 2001/006; B60H 2001/3255; B60H 2001/3266; B60H 2001/3272; F25B 2500/12; F25B 2500/13; F24F 1/40
See application file for complete search history.

(56) References Cited

U.S. PATENT DOCUMENTS

| | | |
|---|---|---|
| 4,561,260 A | 12/1985 | Nishi et al. |
| 5,117,646 A | 6/1992 | Nose et al. |
| 6,233,957 B1 | 5/2001 | Hirao et al. |
| 6,679,078 B2 | 1/2004 | Yoshida et al. |
| 8,393,170 B2 | 3/2013 | Taguchi |
| 2010/0076602 A1* | 3/2010 | Lee ............... B60H 1/3205 700/275 |
| 2011/0146320 A1 | 6/2011 | Tomiyama et al. |
| 2012/0291467 A1* | 11/2012 | Sasaki ............ B60H 1/3208 62/151 |
| 2013/0139532 A1* | 6/2013 | Hashigaya ...... B60H 1/00764 62/134 |
| 2014/0039687 A1* | 2/2014 | Mercer ............ G05D 23/19 700/276 |
| 2015/0224848 A1* | 8/2015 | Eisenhour ...... B60H 1/0075 62/186 |

* cited by examiner

*Primary Examiner* — Jonathan Bradford
(74) *Attorney, Agent, or Firm* — Vichit Chea; Brooks Kushman, P.C.

(57) ABSTRACT

A vehicle cooling system may include a variable displacement compressor, and a controller configured to, in response to a determination that the compressor is operating within a gurgling zone that is defined by a predefined range of compressor speeds and currents, generate a current signal defining a displacement for the compressor based on a speed of the compressor and an ambient temperature to control the displacement to reduce refrigerant flow noise.

12 Claims, 3 Drawing Sheets

VARIABLE DISPLACEMENT VEHICLE COMPRESSOR WITH NOISE PREVENTION CONTROL

TECHNICAL FIELD

Disclosed herein are variable displacement devices.

BACKGROUND

Vehicles often include air cooling systems to cool the ambient air within the cabin of the vehicle. Such systems sometimes include variable displacement compressors to meet varying cooling demands.

SUMMARY

A vehicle cooling system may include a variable displacement compressor, and a controller configured to, in response to a determination that the compressor is operating within a gurgling zone that is defined by a predefined range of compressor speeds and currents, generate a current signal defining a displacement for the compressor based on a speed of the compressor and an ambient temperature to control the displacement to reduce refrigerant flow noise.

A vehicle may include a variable displacement compressor associated with an air conditioning system; and a controller configured to receive vehicle data indicating an ambient temperature and an engine speed, and in response to a determination that the ambient temperature and engine speed fall within respective predefined ranges that are indicative of a compressor gurgling zone, generate a current signal for the compressor based on the ambient temperature and engine speed to define a displacement for the compressor.

A method for a vehicle cooling system may include receiving vehicle data indicating an ambient temperature and an engine speed; and in response to a determination that a compressor of the vehicle cooling system is operating in a gurgling zone based on the vehicle data, generating a current signal based on the vehicle data to control a compressor displacement to reduce refrigerant flow noise.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles often include air cooling systems that use a variable displacement compressor. At low compressor speeds and mild temperatures, vehicle cooling systems with variable displacement compressors may generate refrigerant flow noise. This flow noise is linked to the thermodynamic state where the refrigerant between the TXV and the condenser is a two-phase mixture of liquid and gas. This situation may occur when the variable compressor displacement is low in order to maintain the evaporator temperature when a heat load on the system is low and the compressor speed is low (e.g., when the vehicle is idling).

Disclosed herein is a controller configure to optimize displacement of the compressor to reduce refrigerant flow noise based on compressor speed and ambient temperatures. The controller may then "tune" the compressor displacement to eliminate the refrigerant flow noise by generating a current signal that defines compressor displacement and a relative suction pressure target. The signal may "clip" the minimum control current that may be sent to the compressor.

Figure 1:
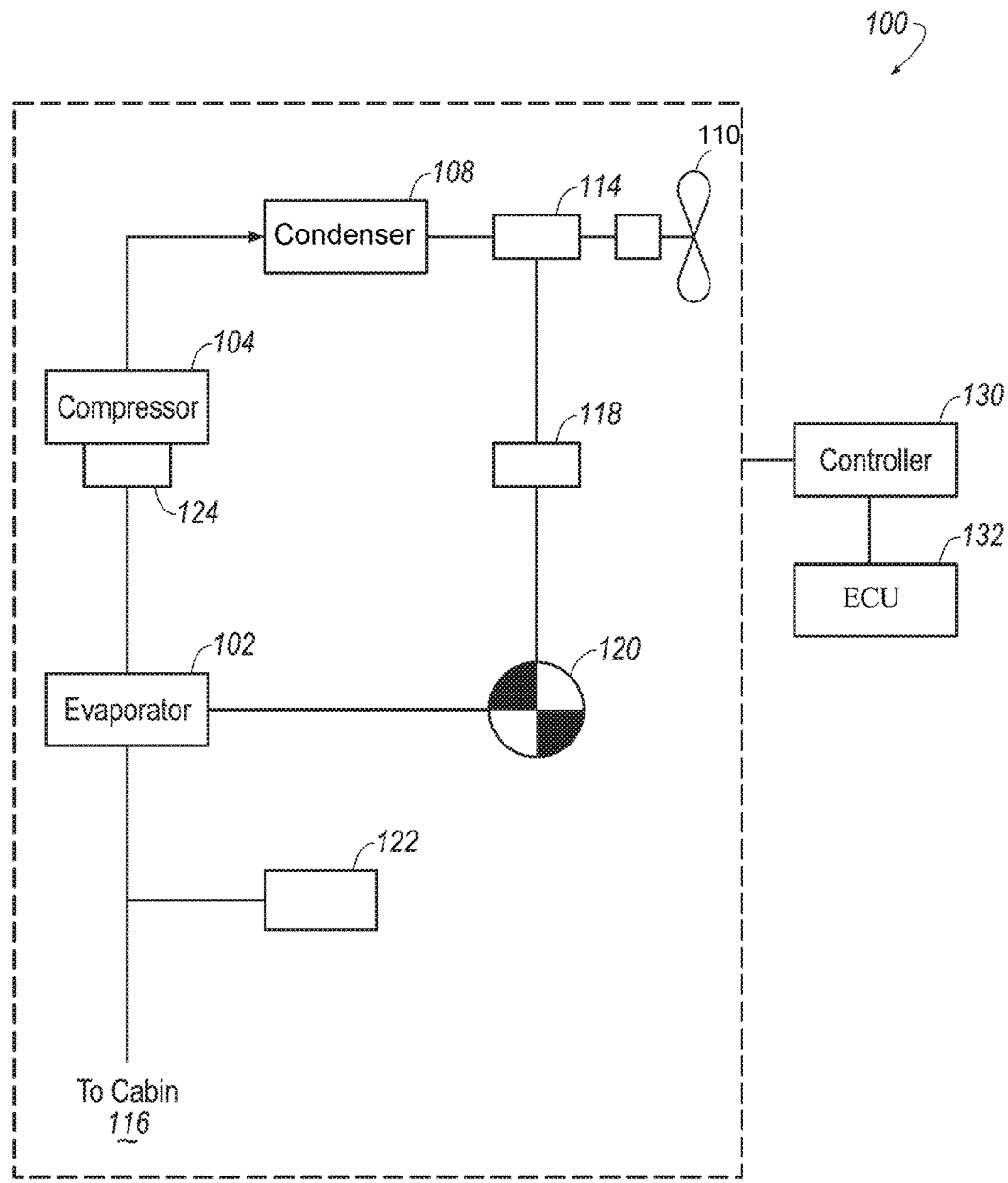
FIG. 1 illustrates an example vehicle cooling system.

FIG. 1 illustrates an example vehicle cooling system 100. The vehicle cooling system 100 may be configured to condition a vehicle cabin for passenger comfort by supplying air at a predetermined temperature. The vehicle cooling system 100 may be configured to process air according to an HVAC control strategy. The cooling system 100 may include an evaporator 102 and compressor 104. The system 100 may also include a condenser 108, an intake fan 110 and an ambient temperature sensor 114. The condenser 108 may reject heat into the ambient air via a fan 110.

The compressor 104 may be a variable displacement compressor configured to automatically adjust its refrigerant capacity based on a desired cabin temperature. The compressor 104 may include a suction port 124 configured to receive refrigerant from the evaporator 102. The speed of the compressor 104 may be proportional to the level of suction at the suction port 124. The speed of the compressor 104 may be adjusted by adjusting the current thereof.

The evaporator 102 may pass refrigerant to the compressor 104. The compressor 104 may then compress the refrigerant into high pressure, high temperature, superheated vapor. The superheated refrigerant condenses into liquid in the condenser 108. Refrigerant flows to a dryer 118, which then passes to a thermal expansion valve (TXV) 120. The TXV 120 is configured to control the rate of refrigerant entering the evaporator 102. If the temperature of the refrigerant leaving the evaporator 102 is above a threshold, the TXV 120 allows more refrigerant to flow into the evaporator 102. If the temperature of the refrigerant leaving the evaporator 102 is below a threshold, the TXV 120 reduces the amount of refrigerant flowing into the evaporator 102. The TXV 120 restricts the flow of the refrigerant causing a pressure drop in the refrigerant.

A fan (not shown) may blow air across the evaporator 102 transferring heat from the air and into the refrigerant. The cooled air is blown into the vehicle cabin 116. The refrigerant leaving the evaporator 102 is low pressure, low temperature superheated vapor that then flows to the compressor 104, and the cycle continues. A cabin temperature sensor 122 may be arranged within or near the vehicle cabin 116 to detect the vehicle cabin temperature.

The system 100 may include a system controller 130 configured to receive data from the components of the system 100. The controller 130 may also be configured to control the operation of the system 100 based on the received data, among other data, presets, profiles, etc. The controller 130 may be configured to receive inputs from a vehicle occupant via a user interface (not shown) within the vehicle cabin 116, such as a graphical user interface, head-up display, mobile device, etc. The inputs may be reflective of a desired cabin temperature. The user interface may also include a vehicle instrument panel configured to allow a vehicle occupant to manually control the vehicle cabin conditions.

The controller 130 may be in communication with other vehicle components and systems. In one example, and as shown in FIG. 1, the controller 130 may be in communication with an engine control unit (ECU) 132. The engine controller 132 may be configured to control various vehicle components including the engine. The ECU 132 may also be configured to receive engine data, among other vehicle data. The engine data may include a current engine speed (i.e., the engine RPM), and an engine state such as idle, park, drive, etc. In some examples, the engine state or vehicle state may be determined by the engine speed.

The vehicle state may include one of a plurality of predetermined vehicle states. These predetermined vehicle states may be a vehicle state where the vehicle is not moving, but is still conditioning the vehicle cabin via the cooling system 100. In one example, the predetermined vehicle state may be an idle state, a park state, a recirculation state, a fresh state, a low blower state, etc. The idle state and park state may be based on the current drive gear of the vehicle. The recirculation state may occur when air is conditioned and does not flow in or out of the cabin interior. The fresh state may occur when outside air is conditioned, flows into the cabin interior, and proceeds to flow out to outside air. The low blower state may occur when the blower is not blowing, or is blowing at a reduced rate. The controller 130 may then use this information for controlling the vehicle cooling system 100.

The controller 130 may also receive inputs from the various sensors within the vehicle and cooling system 100. For example, the controller 130 may receive an ambient temperature from the ambient temperature sensor 114. The controller 130 may receive a cabin temperature from the cabin temperature sensor 122.

The controller 130 may control the compressor current based on various received user inputs and sensor inputs. Various heuristics may be carried out by the controller 130 to provide optimal passenger comfort. The controller 130 may also take into consideration the vehicle state, as well as other vehicle systems and components, in determining a compressor current. For example, the controller 130 may adjust the compressor current based on the ambient temperature, vehicle state, and the engine speed. This is described in further detail below.

Figure 2:
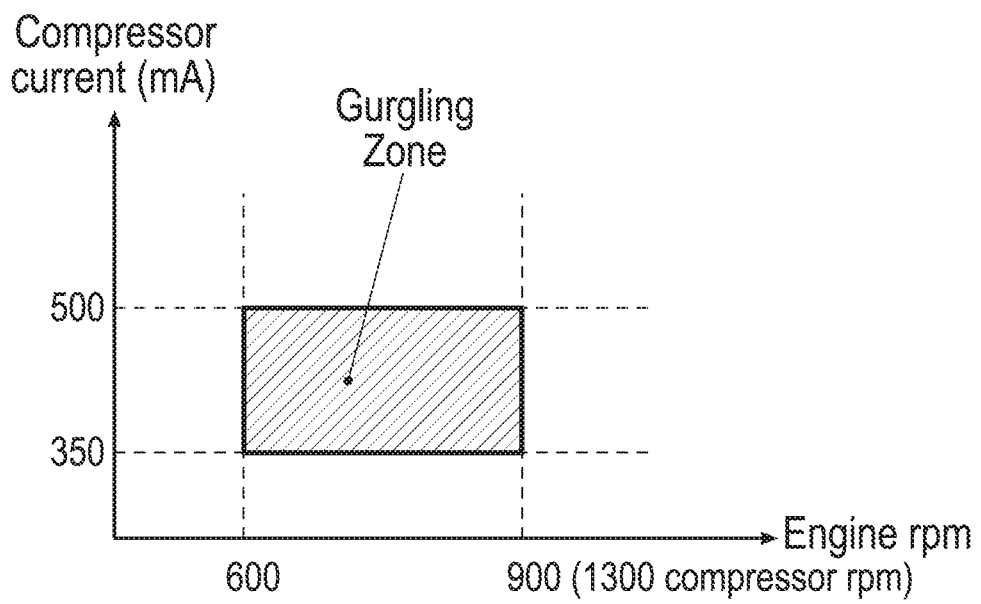
FIG. 2 illustrates an example chart for a gurgling zone based on compressor current and engine speed.

FIG. 2 illustrates an example chart 200 for a gurgling zone based on compressor current and engine speed. In driving situations where the ambient temperature is within a predefined temperature range (e.g., approximately 45 degrees to 85 degrees Fahrenheit), and the compressor speed is low (e.g., 1000-1100 RPMs), the compressor may generate refrigerant flow noise, which may be heard by passengers within the vehicle cabin. This often occurs in response to the refrigerant between the TXV 120 and the condenser being a mixture of liquid and gas. In this thermodynamic state, the flow noise may be heard, especially when the vehicle is idling. In other words, when the heat load on the system 100 is low, and the compressor speed is low, system 100 may create a "gurgling" sound. Such noise, vibration, and harshness (NVH) may decrease driver satisfaction.

For example, at an ambient temperature of 72 degrees Fahrenheit, refrigerant flow noise may be more noticeable on four cylinder engines at an idle state where the idle RPM of the compressor is approximately 1000-1100 RPMs. In another example, on six cylinder engines, refrigerant flow noise may be much worse where the idle RPM of the compressor is approximately 850-950 RPMs.

A low heat load may occur when the ambient temperature is relatively mild (e.g., around 72 degrees Fahrenheit) and when the cabin temperature is also around the same. During this situation, the compressor speed may be low and an evaporator temperature may be low.

Referring to FIG. 2, a gurgling zone may be established based on certain engine speeds and compressor currents. In the example shown in FIG. 2, the gurgling zone may be realized when the engine speed is within a predefined speed range (e.g., between 600 and 900 RPMs), and when the compressor current is within a predefined current range (between 350 and 500 mAs). During the gurgling zone, the controller 130 may be configured to adjust the compressor current in an effort to eliminate or decrease the NVH created by the system 100. That is, the controller 130 may determine a minimum amount of compressor current necessary to maintain the demands of the system 100. Decreasing the current may decrease the mass flow of refrigerant, preventing the gurgling and decreasing the NVH.

Figure 3:
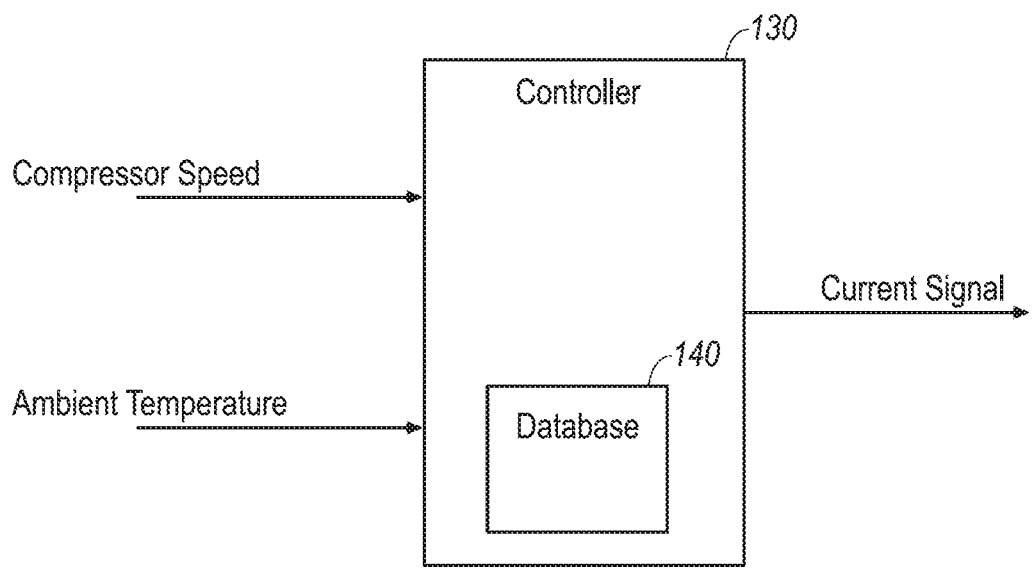
FIG. 3 illustrates an example block diagram for the cooling system.

FIG. 3 illustrates an example block diagram for the cooling system 100. The controller 130 may include, or be in communication with, a database 140. The database 140 may include various look-up tables for the cooling system 100 so that the cooling system 100 may "tune" or adjust the compressor current to avoid or decrease the NVH created by the refrigerant flow. The look-up tables may include vehicle-specific minimum currents that the compressor 104 may operate under based on a specific set of circumstances. For example, in a certain ambient temperature range, and at a certain compressor speed, the compressor current may be clipped to a certain value. Once the controller 130 determines the updated current, the updated current may be transmitted via a current signal to the compressor 104. The adjusted compressor current may optimize the displacement of the compressor 104 by "clipping" the minimum control current that may be sent to the compressor 104 (e.g., 0.6 mA-0.8 mA).

Figure 4:
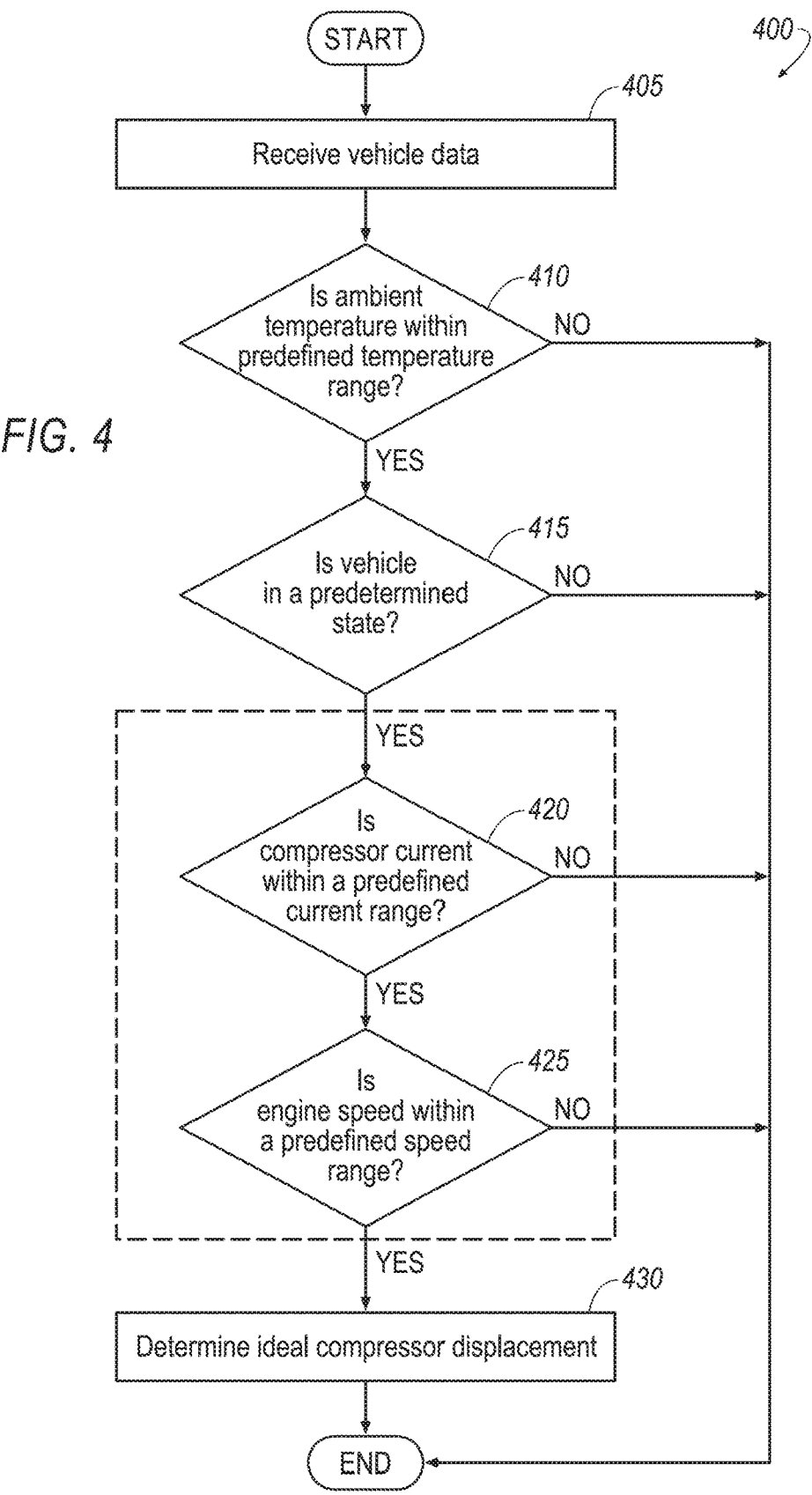
FIG. 4 illustrates an example process for the cooling system.

FIG. 4 illustrates an example process 400 for the cooling system 100. The process 400 may begin at block 405. At block 405, the controller 130 may receive vehicle data indicative of various vehicle conditions, states, etc. The vehicle data may also include air cooling data indicative of sensor data from the cooling system 100, as well as other parameters such as the compressor speed and current, etc.

At block 410, the controller 130 may determine whether the ambient temperature is within a predefined temperature range. For example, the predefined temperature range may be between 70 and 80 degrees Fahrenheit, though ranges may vary. In one example, an ambient temperature of 72 degrees Fahrenheit may be considered to be within the predefined temperature range. If the ambient temperature is within the predefined temperature range, the process 400 proceeds to block 415. If not, the process 400 ends.

At block 415, the controller 130 may determine whether the vehicle is in a predetermined non-moving state. As explained above, the predetermined vehicle state may be a state where the vehicle is not moving, but is still conditioning the vehicle cabin via the cooling system 100. During these states, other vehicle NVH may be minimal, thus making condenser gurgling more noticeable. In one example, the predetermined vehicle state may be an idle state, a park state, a recirculation state, a fresh state, a low blower state, etc. If the vehicle is in a predetermined non-moving state, the process 400 proceeds to block 420.

At block 420, the controller 130 may determine whether the compressor current is within a predefined current range. As explained above, the predefined current range may be between 350 and 500 mAs. If the compressor current is within the current range, the process 400 proceeds to block 425. If not, the process 400 ends.

At block 425, the controller 130 may determine whether the engine speed is within a predefined speed range. The predefined speed range may be the speed of the engine that gurgling is most likely to occur. For example, the range may be between 600 and 900 rpms. If the engine speed is within the speed range, the process 400 proceeds to block 430. If not, the process 400 ends.

At block 430, the controller 130 may determine the ideal compressor displacement and associated compressor current based on the vehicle data. As explained above, the adjusted compressor current may be determined by using a vehicle specific look-up table within the database 140. The compressor speed and ambient temperature may be used to determine the adjusted compressor current.

At block 435, the controller 130 may transmit a current signal including the adjusted compressor current to the compressor 104. The process 400 may then end.

Accordingly, a current of a variable displacement compressor may be adjusted based on compressor speed and ambient temperature. By adjusting the compressor current, the suction at the suction port of the compressor may be adjusted to reduce the gurgling noise created in low load situations. By managing the compressor current, the need for insulators to avoid undue NVH and other noises may be eliminated. An overall better user experience may be achieved while maintaining the efficiencies of the vehicle cooling system.

Computing devices, such as the controllers, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.) stored on computer readable media associated there with (e.g., disks, memories, etc.). A computer program product may comprise such instructions stored in computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle cooling system comprising:
a variable displacement compressor; and
a controller configured to, in response to a determination that the compressor is operating within a predefined range of compressor speeds and currents that define a gurgling zone, generate a current signal defining a displacement for the compressor, the current signal based on a speed of the compressor and an ambient temperature to control the displacement to reduce refrigerant flow noise, and further configured to generate the current signal based on the speed and ambient temperature only if the ambient temperature falls within a predefined temperature range.

2. The system of claim 1, wherein the controller is further configured to generate the current signal based on the speed and ambient temperature only if compressor current is within a predefined current range.

3. The system of claim 1, wherein the controller is further configured to generate the current signal based on the speed and ambient temperature only if vehicle engine speed is within a predefined speed range.

4. The system of claim 1, wherein generating the current signal based on the speed and ambient temperature includes inspecting a vehicle specific look-up table.

5. The system of claim 1, wherein the gurgling zone is further defined by a vehicle state being an idle state, a park state, a recirculation state, a fresh state, or a low blower state.

6. A vehicle comprising:
a variable displacement compressor associated with an air conditioning system; and
a controller configured to
receive vehicle data indicating an ambient temperature and an engine speed, and
in response to a determination that the ambient temperature and engine speed fall within respective predefined ranges that are indicative of a compressor gurgling zone, generate a current signal for the compressor based on the ambient temperature and engine speed to define a displacement for the compressor.

7. The system of claim 6, wherein generating the current signal based on the ambient temperature and engine speed includes inspecting a vehicle specific look-up table.

8. The system of claim 6, wherein the controller is further configured to generate the current signal based on the ambient temperature and engine speed only if compressor current is within a predefined current range.

9. The system of claim 6, wherein the controller is further configured to generate the current signal based on the ambient temperature and engine speed only if the vehicle is in an idle state, a park state, a recirculation state, a fresh state, or a low blower state.

10. A method for a vehicle cooling system, comprising:
   receiving vehicle data indicating an ambient temperature and an engine speed; and
   in response to a determination that the ambient temperature and engine speed fall within respective predefined ranges that are indicative of a gurgling zone of a compressor of the vehicle, generating a current signal based on the vehicle data to control a compressor displacement to reduce refrigerant flow noise, wherein the generating is only performed if compressor current is within a predefined current range.

11. The method of claim 10, wherein the generating includes inspecting a vehicle specific look-up table.

12. The method of claim 10, wherein the generating is only performed if a vehicle is in an idle state, a park state, a recirculation state, a fresh state, or a low blower state.

* * * * *